(12) United States Patent
Hori

(10) Patent No.: US 7,385,738 B2
(45) Date of Patent: Jun. 10, 2008

(54) READ MODULE, POOR CONNECTION DETECTION APPARATUS AND POOR CONNECTION DETECTION METHOD OF READ MODULE

(75) Inventor: Yuji Hori, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 742 days.

(21) Appl. No.: 10/752,512

(22) Filed: Jan. 8, 2004

(65) Prior Publication Data
US 2004/0141212 A1 Jul. 22, 2004

(30) Foreign Application Priority Data
Jan. 8, 2003 (JP) ............... 2003-002418

(51) Int. Cl.
H04N 1/46 (2006.01)
H04N 1/00 (2006.01)

(52) U.S. Cl. .............. 358/504; 358/404; 358/405; 358/406; 358/501; 358/505; 358/509; 358/510; 358/514; 358/516; 324/538; 430/635

(58) Field of Classification Search ............ 358/404, 358/405, 406, 501, 504, 505, 509, 510, 514, 358/516; 324/538; 430/635
See application file for complete search history.

(56) References Cited

U.S. PATENT DOCUMENTS 3,790,706 A * 2/1974 Gubala et al. ............ 348/572
3,961,242 A * 6/1976 Rose ........................ 324/404
4,000,365 A * 12/1976 Vandling .................. 358/406
4,706,130 A * 11/1987 Yamakawa ............... 358/296
5,121,230 A * 6/1992 Honma et al. ............ 358/500

(Continued)

FOREIGN PATENT DOCUMENTS

JP  A 62-177783  8/1987

(Continued)

OTHER PUBLICATIONS

Japanese Patent Abstract Inventor: Noguchi et al. Title: Fault Detection System for Serial Communication Circuit Publication Date: May 19, 1995 Publication No. JP 07-131505 Application No. 05-276437.*

(Continued)

*Primary Examiner*—King Y. Poon
*Assistant Examiner*—Richard Z Zhu
(74) *Attorney, Agent, or Firm*—Oliff & Berridge, PLC

(57) ABSTRACT

A read module includes: a light source that applies light to an original to read an image; a photoelectric conversion section that converts reflected light from the original into an image signal of the image; and a connector to be electrically connected to a controller connector in a controller. The connector has a plurality of terminals placed side by side in a predetermined direction. The plurality of terminals includes an image signal output terminal section that outputs the image signal to the controller and a power terminal section that inputs electric power for lighting the light source supplied from the controller to the read module. The power terminal section is placed in the proximity of one end of the plurality of terminals in the predetermined direction thereof. The image signal output terminal section is placed in the proximity of an opposite end in the predetermined direction thereof.

3 Claims, 6 Drawing Sheets

U.S. PATENT DOCUMENTS

| | | | |
|---|---|---|---|
| 5,307,049 A | * | 4/1994 | Uchida et al. ............... 340/507 |
| 5,548,211 A | * | 8/1996 | Tujide et al. ............ 324/158.1 |
| 5,956,160 A | * | 9/1999 | Watanabe ................... 358/496 |
| 2002/0152056 A1 | * | 10/2002 | Herzog et al. .................. 703/2 |

FOREIGN PATENT DOCUMENTS

| | | | | |
|---|---|---|---|---|
| JP | | 03199980 A | * | 8/1991 |
| JP | A | 6-339051 | | 12/1994 |
| JP | | 07131505 A | * | 5/1995 |
| JP | | 07296695 A | * | 11/1995 |
| JP | | 08140255 A | * | 5/1996 |
| JP | B2 | 2802760 | | 7/1998 |
| JP | | 10268834 A | * | 10/1998 |
| JP | B2 | 3027760 | | 1/2000 |
| JP | | 2001077864 A | * | 3/2001 |
| JP | A | 2001-77864 | | 3/2001 |
| JP | A | 2001-142797 | | 5/2001 |

OTHER PUBLICATIONS

Japanese Patent Abstract Inventor: Nagoya et al. Title: Network System Publication Date: Mar. 23, 2001 Publication No. JP 2001-077864 Application No. 11-254340.*

Japanese Patent Abstract Inventor: Hirata Toshiyuki. Title: Defective Connection Detecting Circuit Publication Date: May 31, 1996 Publication No. JP 08-140255 Application No. 06-271437.*

Japanese Patent Abstract Inventor: Sugiyama Sadakazu. Title: Apparatus for Inspecting Wiring of Connecting Cable Publication Date: Aug. 30, 1991 Publication No. JP 03-199980 Application No. 01-342533.*

Japanese Patent Abstract Inventor: Maekawa et al. Title: Relay Contact Abnormality Detecting Circuit Publication Date: Nov. 10, 1995 Publication No. JP 07-296695 Application No. Jun. 114264.*

Japanese Patent Abstract Inventor: Heiji Akinaga. Title: Aggregate Type Display Device □□Publication Date: Oct. 19, 1998 Publication No. JP 10-268834 Application No. 09-068311.*

* cited by examiner

READ MODULE, POOR CONNECTION DETECTION APPARATUS AND POOR CONNECTION DETECTION METHOD OF READ MODULE

BACKGROUND OF THE INVENTION

1. Field of the Invention

This invention relates to a read module including a light source and photoelectric conversion elements for detecting an optical image and a poor connection detection apparatus and a poor connection detection method for detecting poor connection between connectors for connecting the read module and a controller for controlling the read module.

2. Background Art

In related arts, a copy, a facsimile, a scanner, or the like includes a read module for reading an image from an original and the read module includes a light source for applying light to an original and photoelectric conversion elements for converting reflected light from the original in to an image signal. Each of the machines also includes a controller for controlling the operation of the read module, and the read module and the controller have connectors electrically connected to each other by a cable.

By the way, in the configuration of connecting the controller and the read module through the connectors, if poor connection of the connectors occurs, it is feared that it may become impossible to output the normal electric signal to the controller or it may become impossible to normally control the read module, namely, a malfunction may occur. Therefore, the connection of the connector of the read module and the connector of the controller requires high reliability.

Then, for example, in a related art, to detect poor connection between paired connectors for connecting circuit boards, first and second ground terminals are disposed at both ends of a plurality of terminals of the connector and a common ground terminal is disposed at an intermediate point of the plurality of terminals and then the potential difference between the first ground terminal and the common ground terminal and the potential difference between the second ground terminal and the common ground terminal are detected by a potential difference comparison section included in a circuit machine and poor connection is detected based on the difference between the former and latter potential differences. That is, if a pair of connectors made up of a male connector and a female connector is inserted in a mutually inclined state, the potential difference between the first ground terminal and the common ground terminal and the potential difference between the second ground terminal and the common ground terminal differ and therefore the difference between the former and latter potential differences is detected for detecting poor connection between the paired connectors. (For example, refer to JP-A-2001-142797 (p. 3-p. 4, FIGS. 1-4))

For example, in a related art, to detect poor connection between paired connectors in a video camera having a read module such as a camera head and a CPU connected by the connectors, a detection terminal for detecting poor connection between the connectors is further disposed in addition to input/output terminals for controlling the essential operation of the camera head and the CPU, and an electric current flowing through the detection terminal is detected, thereby detecting poor connection. (For example, refer to JP-A-6-339051 (p. 2-p. 3, FIGS. 1-3))

However, according to the detection method of poor connection between the connectors disclosed in JP-A-2001-142797, the connector needs to be provided with the first ground terminal, the second ground terminal, the common ground terminal, and the like in addition to the input/output terminals for inputting/outputting the essential operation signal of the circuit machine. Thus, the number of the terminals of the connector increases and it becomes difficult to miniaturize the connector and the space to which the connector is connected; this is a problem.

Also in the detection method of poor connection between the connectors in the video camera disclosed in JP-A-6-339051, to detect poor connection between the connectors, the detection terminal for detecting poor connection between the connectors needs to be further disposed in addition to the input/output terminals for controlling the essential operation of the camera head and the CPU. Thus, it becomes difficult to miniaturize the connector and the space to install the connector; this is a problem.

SUMMARY OF THE INVENTION

It is therefore an object of the invention to provide a read module and a poor connection detection apparatus and a poor connection detection method of the read module for detecting poor connection between a connector included in the read module and a controller connector included in a controller for electrically connecting the read module and the controller for controlling the read module, suppressing malfunction of the controller and the read module to provide high reliability, and making it possible to miniaturize the space to install the connector and provide high reliability of electric connection without increasing the number of terminals to detect poor connection between the connectors.

To achieve the object, the invention provides a read module including: a light source that applies light to an original to read an image on the original; a photoelectric conversion section that converts reflected light from the original into an image signal of the image; and a connector to be electrically connected to a controller connector in a controller for controlling the read module. The connector has a plurality of terminals placed side by side in a predetermined direction. The plurality of terminals include an image signal output terminal section that outputs the image signal to the controller and a power terminal section that inputs electric power for lighting the light source supplied from the controller to the read module. The power terminal section is placed in the proximity of one end of the plurality of terminals in the predetermined direction thereof. The image signal output terminal section is placed in the proximity of an opposite end in the predetermined direction thereof.

According to the invention, to connect the connector included in the read module and the controller connector, when the connectors are inclined in the placement direction of the plurality of terminals and are inserted in an incomplete state and poor connection occurs, poor connection between the connectors can be detected as the image signal output from the image signal output terminal section of the read module is checked. That is, if the power terminal section for lighting the light source is placed in the proximity of one end of the plurality of terminals and the image signal output terminal section is placed in the proximity of the opposite end, when the connector of the read module is inserted into the controller connector in such a manner that it is inclined and poor connection occurs, the image signal output from the image signal output terminal section easily changes, so that the image signal can be detected for detecting poor connection. Poor connection can be detected using the image signal output terminal section required for reading the original image by the read module and the power terminal section and it is not necessary to add any new terminal for detecting poor connection, so that the connector and the space to install the connector can be miniaturized.

The invention may provide an apparatus, including: alight source that applies light to an original to read an image on the original; a photoelectric conversion section that converts reflected light from the original into an image signal of the image; a connector to be electrically connected, the connector including a plurality of terminals placed side by side in a predetermined direction, the plurality of terminals including an image signal output terminal section that outputs the image signal and a power terminal section that inputs electric power for lighting the light source; an output signal acquisition unit configured to acquire a difference between a voltage value of a white-level image signal and a voltage value of a black-level image signal, each separately output from the photoelectric conversion section via the image signal output terminal section; and a poor connection detection unit configured to detect presence or absence of poor connection of the connector based on the difference acquired by the output signal acquisition unit. The power terminal section is placed in the proximity of one end of the plurality of terminals in the predetermined direction thereof. The image signal output terminal section is placed in the proximity of an opposite end in the predetermined direction thereof.

According to the invention, the difference between the white-level and black-level voltage values output from the image signal output terminal section of the connector is acquired, and the presence or absence of poor connection of the connector is detected based on the voltage value difference. Thus, when the connector is inclined in the placement direction of the plurality of terminals relative to a connector inserted into the connector and mutual insertion becomes incomplete and poor connection occurs, poor connection between the connectors can be detected easily. That is, as the power terminal section is placed in the proximity of one end of the plurality of terminals and the image signal output terminal section is placed in the proximity of the opposite end, the voltage of the image signal output from the image signal output terminal section easily changes, so that poor connection caused by inclination of the connector can be detected easily. Poor connection can be detected using the image signal output terminal section required for reading the image and the power terminal section and it is not necessary to add any new terminal for detecting poor connection, so that productivity is also excellent.

The invention may provide a poor connection detection method between a connector provided in a read module and a controller connector provided in a controller for controlling the read module, the connector including a plurality of terminals placed side by side in a predetermined direction, the plurality of terminals including an image signal output terminal section that outputs the image signal to the controller, the method including: detecting white-level and black-level image signals separately output from the image signal output terminal section, voltage values of the white-level and black-level image signals to be used as the references for correcting variations in sensitivity in the read module; acquiring a difference between the white-level voltage value and the black-level voltage value; and detecting presence or absence of poor connection between the connectors based on the acquired difference.

According to the invention, the difference between the white-level and black-level voltage values output from the image signal output terminal section of the connector is acquired, and the presence or absence of poor connection between the connectors is detected based on the voltage value difference. Thus, when the connector of the read module is inclined in the placement direction of the plurality of terminals relative to the controller connector of the controller and mutual insertion becomes incomplete and poor connection occurs, poor connection between the connectors can be detected easily. That is, as the power terminal section is placed in the proximity of one end of the plurality of terminals and the image signal output terminal section is placed in the proximity of the opposite end, the voltage of the image signal output from the image signal output terminal section easily changes, so that poor connection caused by inclination of the connector can be detected easily. Poor connection can be detected using the image signal output terminal section required for reading the image and the power terminal section and it is not necessary to add any new terminal for detecting poor connection, so that productivity is also excellent.

The invention may provide a poor connection detection apparatus, including: a read module; and a controller configured to control the read module and having a controller connector. The read module includes: a light source that applies light to an original to read an image on the original, a photoelectric conversion section that converts reflected light from the original into an image signal of the image, and a connector to be electrically connected to the controller connector, the connector including a plurality of terminals placed side by side in a predetermined direction, the plurality of terminals including an image signal output terminal section that outputs the image signal to the controller and a power terminal section that inputs electric power for lighting the light source supplied from the controller to the read module. The controller includes: an output signal acquisition unit configured to acquire a difference between a voltage value of a white-level image signal and a voltage value of a black-level image signal, each separately output from the photoelectric conversion section via the image signal output terminal section, and a poor connection detection unit configured to detect presence or absence of poor connection between the connector and the controller connector based on the difference acquired by the output signal acquisition unit. The power terminal section is placed in the proximity of one end of the plurality of terminals in the predetermined direction thereof. The image signal output terminal section is placed in the proximity of an opposite end in the predetermined direction thereof.

The invention may provide a poor connection detection apparatus for detecting poor connection between a connector provided in a read module and a controller connector, the connector including a plurality of terminals having image signal output terminal section that outputs the image signal to the controller, the apparatus including: an output signal acquisition unit configured to acquire a difference between a voltage value of a white-level image signal and a voltage value of a black-level image signal, each used as a reference for correcting variations in the sensitivity of the read module and each separately output from the image signal output terminal section; and a poor connection detection unit configured to detect presence or absence of poor connection of the connector based on the difference acquired by the output signal acquisition unit.

BRIEF DESCRIPTION OF THE DRAWINGS

The present invention may be more readily described with reference to the accompanying drawings, in which.

DETAILED DESCRIPTION OF THE PREFERRED EMBODIMENTS

A read module of the invention will be discussed with reference to the accompanying drawings.

Figure 1:
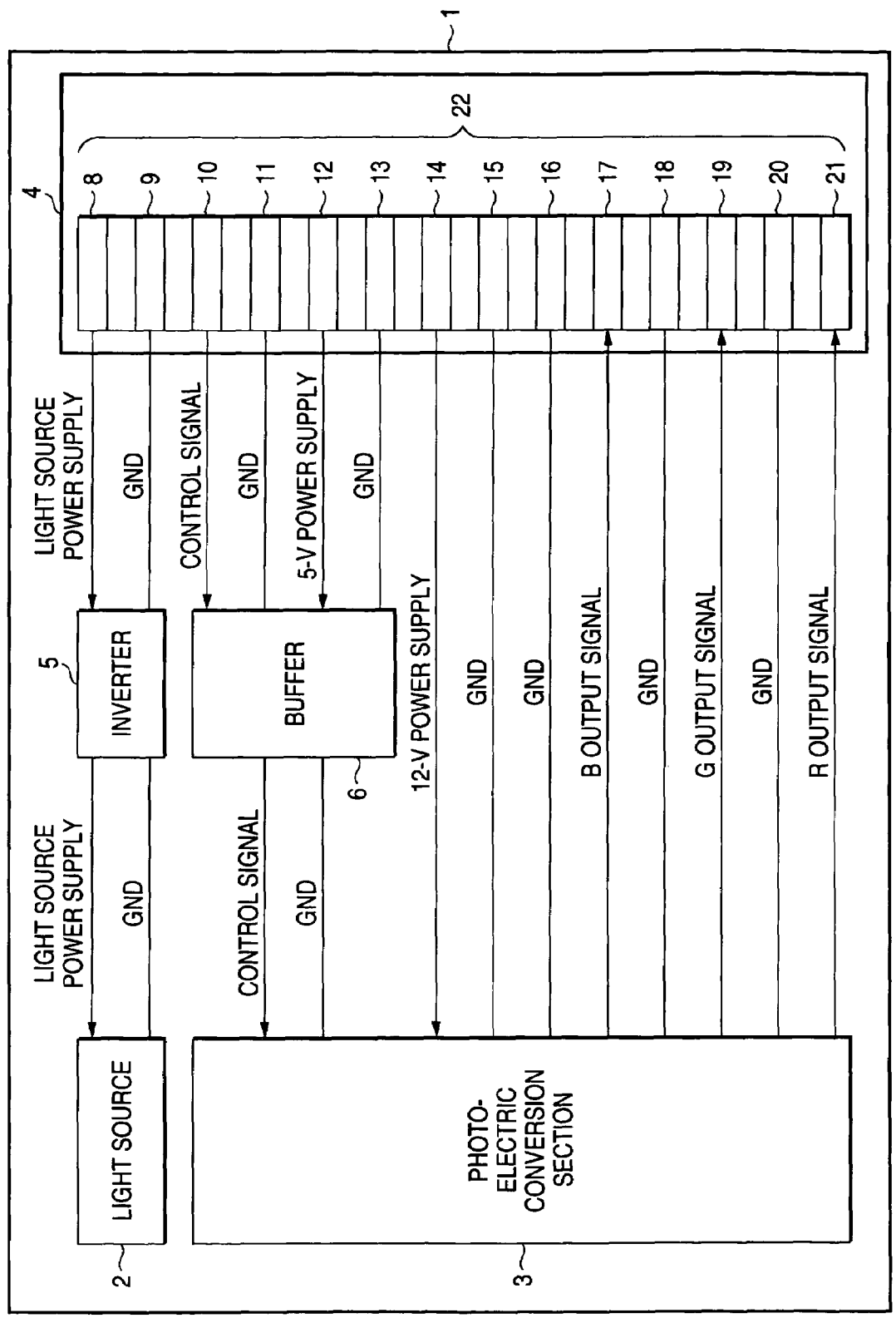
FIG. 1 is a block diagram to represent the configuration of a read module of an embodiment incorporating the invention.

In FIG. 1, a read module 1 includes a light source 2 for applying light to an original to read an image on the original, a photoelectric conversion section 3, such as a CCD (charged-coupled device), for converting reflected light from the original into an image signal of the image, and a connector 4 for electrically connecting to a controller (51 in FIG. 2) for controlling the read module 1.

The read module 1 also includes an inverter 5 for DC current input from the controller (51 in FIG. 2) through the connector 4 into AC current to cause the light source 2 to emit light and a buffer 6 for correcting a control signal input from the controller (51 in FIG. 2) through the connector 4 to an operation signal of the photoelectric conversion section 3 to cause the photoelectric conversion section 3 to perform predetermined operation.

The light source 2, such as a cold cathode fluorescent lamp (CCFL), emits light based on the current applied through the inverter 5.

Next, the photoelectric conversion section 3 is made up of a large number of photosensitive elements (for example, photodiodes) with color filters of the three primary colors of light, red (R), green (G), and blue (B), on silicon substrate to detect a color image. Receiving light applied to an original from the light source 2 and reflected on the original, the photoelectric conversion section 3 accumulates the light as signal charges of the three primary colors R, G, and B, converts the light energy responsive to the strength of the light into charges (photoelectric conversion), and outputs the provided signal to the controller (51 in FIG. 2) through an image signal output terminal of the connector 4 based on a command signal from the controller (51 in FIG. 2). In the read module 1, the brightness of the read image varies due to unevenness of the intensity of the emitted light from the light source 2, noise occurrence on an optical path, etc., and thus the variations need to be corrected. The CCD contains a light shield area masked for preventing light from entering photoelectric conversion elements. The image signal read in the area is black-level data (voltage value) and the image signal read in an unmasked area for detecting light is white-level data (voltage value). The black-level data and white-level data can be output from image signal output terminals 17, 19, and 21 of the connector 4. To correct the variations, the image signal when a white board as the reference is read is stored and the image signal provided when an original is read is corrected based on the data of that image signal.

Next, the connector 4 has a plurality of terminals 22 placed side by side in the same direction, as shown in FIG. 1.

The terminals are made up of a power terminal 8 for inputting power for lighting the light source 2 into the read module 1 and a ground terminal 9 of the terminal 8, a control signal terminal 10 for inputting a control signal for controlling the operation of the photoelectric conversion section 3 and a ground terminal 11 of the terminal 10, a power terminal 12 to which 5-V power is supplied from the controller (51 in FIG. 2) for operating the buffer 6 and a ground terminal 13 of the terminal 12, a power terminal 14 to which 12-V power is supplied from the controller (51 in FIG. 2) for operating the photoelectric conversion section 3 and a ground terminal 15 of the terminal 14, and the above-mentioned image signal output terminals 17, 19, and 21 for outputting the blue (B), green (G), and red (R) image signal of the reflected light on the original, provided by the photoelectric conversion section 3 and ground terminals 16, 18, and 22 of the terminals 17, 19, and 21.

The power terminal 8 for lighting the light source 2 is placed on the outermost side of one end in the arrangement direction of the terminals 22, and the image signal output terminal 21, one of the image signal output terminals 17, 19, and 21 for outputting the blue (B), green (G), and red (R) image signal, is placed on the outermost side of an opposite end in the arrangement direction of the terminals 22.

Figure 2:
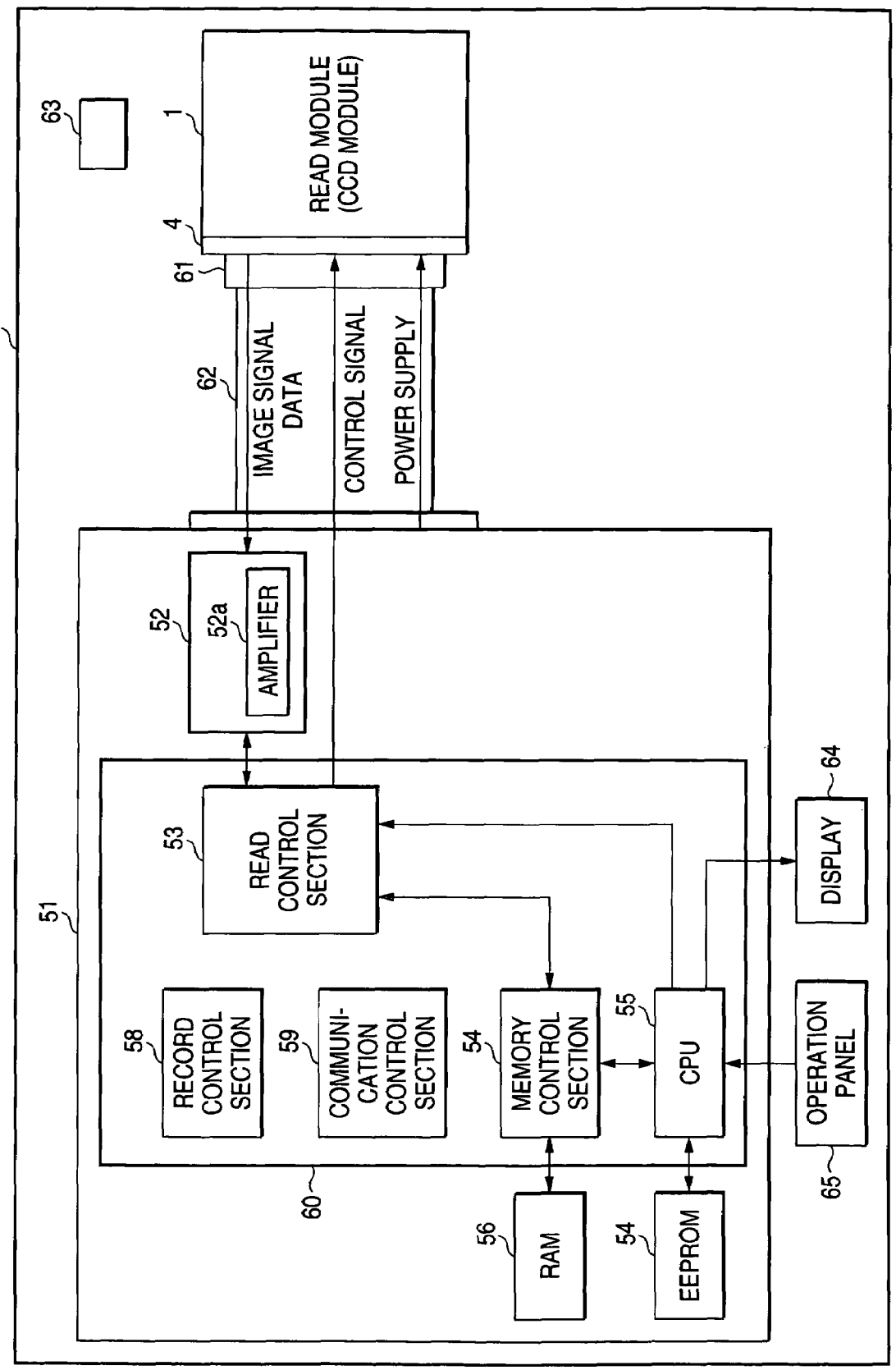
FIG. 2 is a block diagram to represent the configuration of a controller of the embodiment incorporating the invention.

The connector 4 is inserted into a controller connector (61 in FIG. 2) included in the controller (51 in FIG. 2) for controlling the operation of the read module 1, whereby the terminals 22 of the connector 4 are electrically connected to a plurality of terminals included in the controller connector (61 in FIG. 2).

Next, the controller of the read module 1 of the invention will be discussed with FIG. 2. FIG. 2 is a block diagram to represent the schematic configuration of the multi functional apparatus 71 including the internal configuration of the controller of the read module 1 of the embodiment incorporating the invention.

Figure 7:
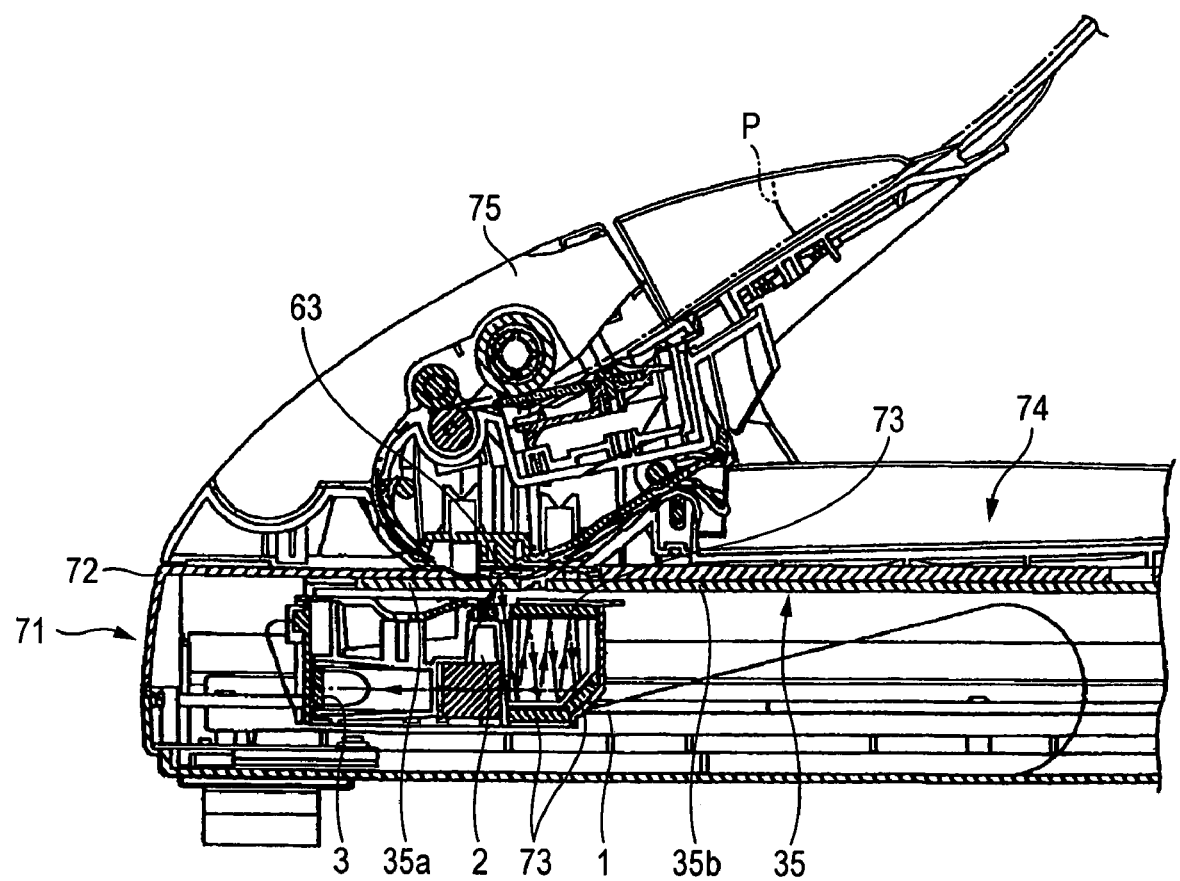
FIG. 7 is a drawing to represent the structure of an image read section of a multi functional apparatus including the controller of the embodiment.

The controller 51 of the embodiment in FIG. 2 is included in the multi functional apparatus 71 shown in FIG. 7 together with the read module 1. The multi functional apparatus 71 is an information machine including various functions such as a copy function, a scanner function, and a facsimile function. However, FIG. 7 represents only the portions involved in image read of the multi functional apparatus 71 as described above. The controller 51 controls the whole operation of the multi functional apparatus 71 and also detects poor connection between the connector 4 of the read module 1 and the controller connector 61.

As shown in FIG. 7, the multi functional apparatus 71 is made up of the read module 1 including the light source 2 and a mirror 73, glass 35 used as the read face of an original P, an ADF (automatic document feeder) 75 for transporting the original P separately one sheet at a time, glass 35a used as the read face to read the original P fed by the ADF with the read module 1 fixed, glass 35b used as the read face on which the original P is placed for read while the read module 1 is moved, a cover 72 for retaining the glass 35a and the glass 35b, an original press cover 74 for pressing the original P, a white board 63 used to acquire a reference signal to correct the read pixel data, and the like.

As shown in FIG. 2, the controller 51 includes an AFE (analog front end) 52 for converting output from the read module 1 into a digital signal and outputting serial data. The AFE 52 performs offset adjustment, gain adjustment, A/D conversion, etc., described later.

The controller 51 is implemented as an ASIC (application-specific integrated circuit) 60 containing a read control section 53 for controlling the operation of the AFE 52, a memory control section 54, etc., the memory control section 54 for controlling write and read of image data, and a CPU 55 for controlling the whole operation of the controller 51. The controller 51 also includes RAM 56 connected to the memory control section 54 for recording image data and EEPROM 57 connected to the CPU 55 for storing various pieces of setup information of the CPU 55.

The controller 51, which is included in the multi functional apparatus 71 as described above, also includes a record control section 58 for controlling the operation of the multi functional apparatus 71, a communication control section 59 for controlling the communication operation, and the like so that an image can be formed on a, record medium based on the image data read by the read module 1 and that the image data can be transmitted to another communication machine.

The connector 4 of the read module 1 is formed for making it possible to insert thereinto the controller connector 61 connected to the tip of a cable 62 connected to a predetermined circuit of the controller 51. Both the connectors 4 and 61 are fitted into each other, whereby the terminals 22 of the connector 4 are electrically connected to the terminals of the controller connector 61 (not shown). The read module 1 applies light to an image on an original according to control signals for controlling the power supply for lighting the light source 2 and the read module 1, input from the controller 51, converts reflected light from the original into an image signal (voltage), and inputs the image signal (voltage) through the connector 4, the controller connector 61, the cable 62, etc., into the controller 51.

Next, the AFE 52, which includes an A/D conversion section for converting an analog signal into a digital signal, converts the image signal (voltage) output from the read module 1 into digital pixel data based on a command signal from the read control section 53, and inputs the pixel data to the read control section 53. The AFE 52 also includes an amplifier 52a for amplifying the image signal (voltage) output from the read module 1 according to a predetermined gain, and the gain can be set to a predetermined value under the control of the read control section 53.

In the embodiment, the amplifier 52a of the AFE 52 provides the function of an amplification unit of the invention.

Next, the read control section 53 inputs the control signal for controlling the operation of the read module 1 to the read module 1 through the connector 4 and controls the AFE 52 so as to make offset adjustment and gain adjustment to the image signal (voltage) input from the read module 1 and also inputs the digital image data provided by the AFE 52 to the memory control section 54.

Next, the memory control section 54 writes the pixel data input from the read control section 53 into a predetermined area of the RAM 56 in sequence and reads the pixel data stored in the RAM 56 and sends the pixel data to the CPU 55 based on a command from the CPU 55.

Next, the CPU 55, which is implemented as a microcomputer for controlling the operation of the controller 51 together with the RAM 56 and the EEPROM 57, includes a program to detect poor connection between the connector 4 of the read module 1 and the controller connector 61 and detects the connection between the connector 4 and the controller connector 61 based on the program. The CPU 55 also controls the operation of a drive (not shown) for moving the read module 1 so that the position of the read module 1 can be moved relatively to the image on the original.

Since the brightness of the image read by the read module 1 varies due to unevenness of the intensity of the emitted light from the light source, noise occurrence on the optical path, etc., the multi functional apparatus 71 is provided with the white board 63 used to acquire a reference signal to correct the pixel data. It is also provided with a display 64 for displaying a message indicating poor connection when poor connection is detected.

Next, the poor connection detection processing procedure executed by the CPU 55 will be discussed with FIGS. 3, 4, and 5.

A poor connection detection apparatus and a poor connection detection method of the invention are realized as the CPU 55 operates for detecting poor connection according to the procedure described with reference to FIGS. 3 to 5. In the flowcharts, S denotes step.

Figure 3:
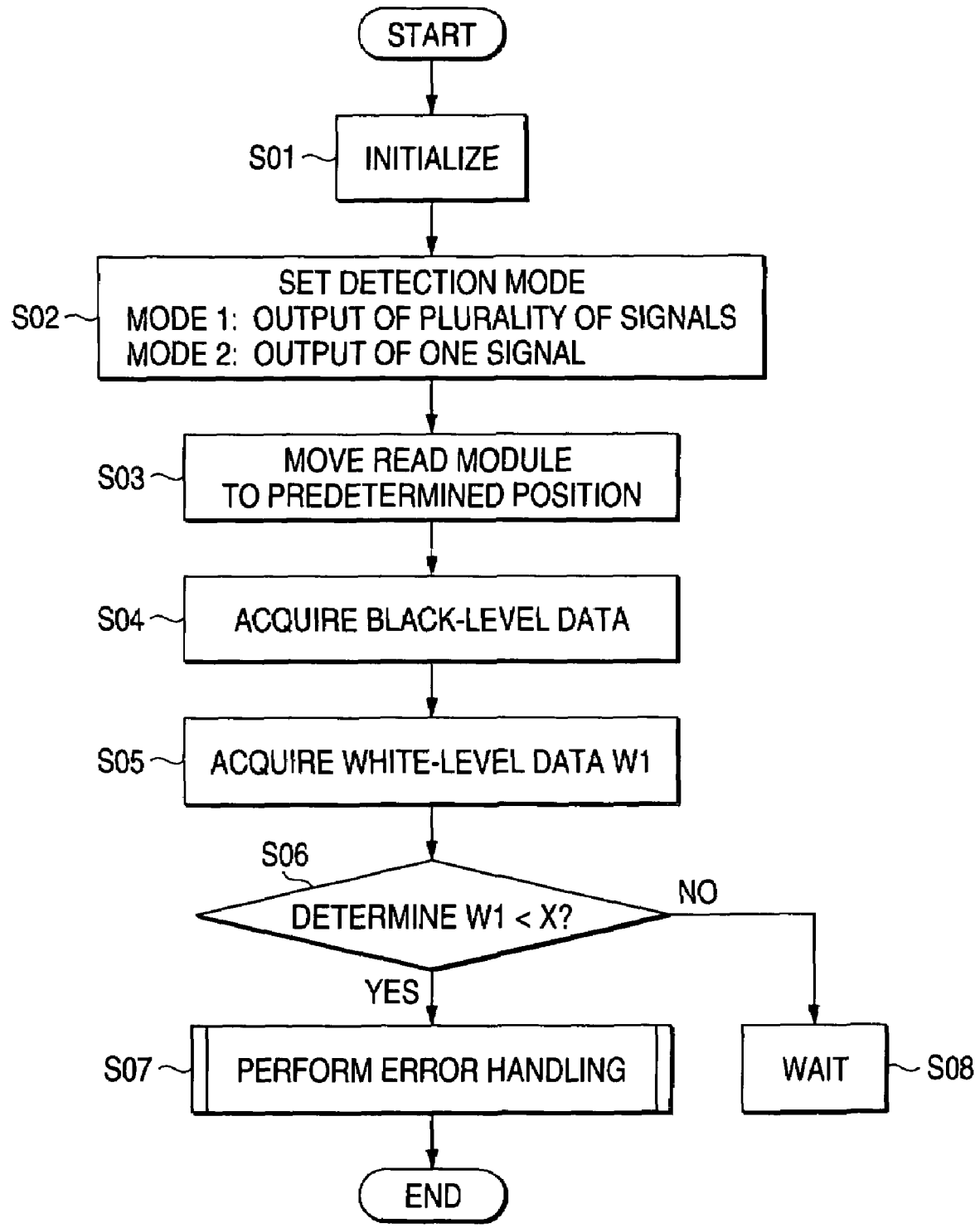
FIG. 3 is a flowchart to represent poor connection detection processing executed by a CPU of the controller of the embodiment.

As the poor connection detection processing procedure, a control procedure shown in the flowchart of FIG. 3 is started when the user gives an instruction for incomplete insertion check through an interface such as an operation panel 65 made up of a panel, a keyboard, etc.

To begin with, at S01, the variables in the CPU 55 and the variables in the read module 1 are initialized.

Figure 4:
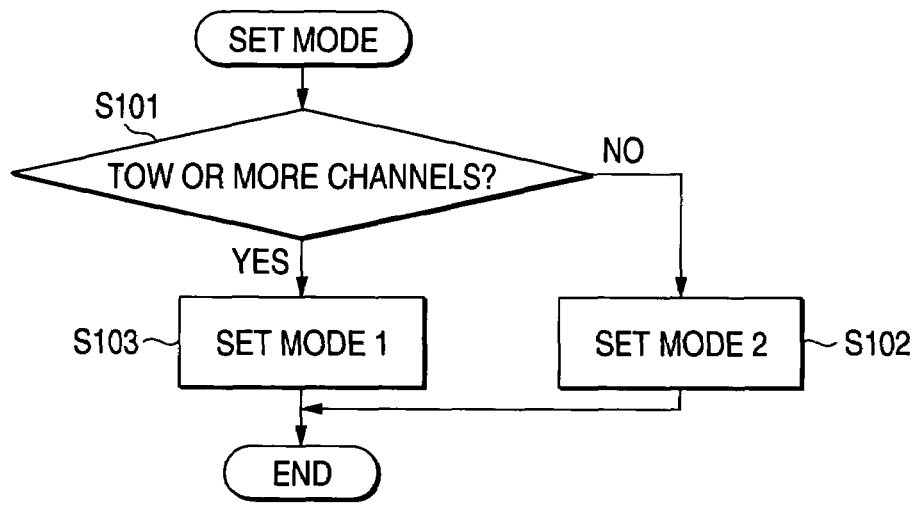
FIG. 4 is a flowchart to represent details of mode setting processing executed in the detection processing in FIG. 3.

Next, at S02, a detection mode is set according to a procedure shown in the flowchart of FIG. 4.

That is, at S101, whether or not the number of image signal output channels of devices of the read module 1 is two or more is determined. Since the information value representing information as to whether or not the number of image signal output channels is two or more is previously input to the EEPROM 57, the CPU 55 acquires the information value from the EEPROM 57 and determines whether or not the number of image signal output channels of devices of the read module 1 is two or more. If the determination at S101 is NO, the process goes to S102 and mode 2, namely, a mode applied when the number of image signal output channels is one is set.

If the determination at S101 is YES, the process goes to S103 and mode 1, namely, a mode applied when the number of image signal output channels is two or more is set.

When the detection mode is thus set, then at S03 in FIG. 3, the read module 1 is moved to a position where it is opposed to the white board 63 previously placed in the multi functional apparatus 71 and used to acquire a reference signal with a predetermined spacing.

Next, at S04, reflected light on the white board 63 is read by the photoelectric conversion element provided in the light shield area masked for preventing light from entering the photoelectric conversion element of the read module 1, and the image signal (voltage) output from the image signal output terminal 17, 19, 21 at the time is acquired in the AFE 52 as black-level data. That is, the black-level data is acquired by the photoelectric conversion element provided in the masked area with the light source 2 lit. The number of pieces of the black-level data may be one.

Next, at S05, offset adjustment is made to the image signal based on the black-level data acquired in the AFE 52, reflected light on the white board 63 is read in the unmasked area for detecting light in the read module 1, and the image signal (voltage) output from the image signal output terminal 17, 19, 21 at the time is acquired in the AFE 52 and is amplified to a predetermined gain by the amplifier 52*a* included in the AFE 52 to provide white-level data. If the white-level data is amplified, offset adjustment is made again based on black-level data amplified in the same gain. Unlike the black-level data, the white-level data is data concerning all pixels of one line in the read range.

In the embodiment, as S03 to S05 are executed, the function of an output signal acquisition unit of the invention is provided.

Next, at S06, white-level data W1 is compared with a predetermined voltage value X to detect poor connection for determining whether or not poor connection exists.

In the embodiment, as S06 is executed, the function of a poor connection detection unit of the invention is provided.

Next, when it is determined at S06 that the white-level data is equal to or greater than the predetermined voltage value X, namely, when data of two-thirds or more, or three-quarters or more of the white-level data of all pixels, for example, is equal to or greater than the predetermined voltage value X, the poor connection detection apparatus determines that no poor connection exists between the controller connector 61 and the connector 4 and an image can be read normally. Then, the process goes to S08 and a wait state is maintained until a command signal from the user is input through an external interface.

When mode 1 is set at S02, S04 to S06 are executed using the image signal output from each of the image signal output terminals 17, 19, and 21 of the read module 1 for each of the image signal output terminals; when mode 2 is set at S02, S04 to S06 are executed using the image signal output from the outermost image signal output terminal 21 of the read module 1.

When it is determined at S06 that the white-level data is less than the predetermined voltage value X, namely, when data more than one-third or one-quarter of the white-level data of all pixels, for example, is less than the predetermined voltage value X, the poor connection detection apparatus determines that poor connection exists between the controller connector 61 and the connector 4. Then, the process goes to S07 and error handling is performed according to the procedure shown in the flowchart of FIG. 5.

That is, at step S210, the setup information of the detection mode set at S02 is acquired and when it is determined that mode 2 is set, the process goes to S220 and the display 64 for displaying an error displays a message indicating poor connection of the power terminal 8 to the light source 2 or the outermost image signal output terminal 21 of the connector 4 of the read module 1.

The setup information of the detection mode set at S02 is acquired and when it is determined that mode 1 is set, the process goes to S230 and whether the number of image signal output channels outputting a defective image signal is one or two or three is determined. In mode 1, S04 to S06 are executed for each of the image signals output from the image signal output terminals 17, 19, and 21 and therefore the number of image signal output channels outputting a defective image signal at S06 can be detected.

When the number of image signal output channels outputting a defective image signal among the image signal output terminals 17, 19, and 21 of the connector 4 of the read module 1 is one, the process goes to S250.

Next, at S250, the display 64 for displaying an error displays a message indicating poor connection of the outermost image signal output terminal 21 of the connector 4 of the read module 1 as at S220. It is considered that the power terminal 8 to the light source 2 is normal because only one of the image signal output terminals outputs a defective image signal. When it is determined at S230 that the number of image signal output channels outputting a defective image signal among the image signal output terminals 17, 19, and 21 of the connector 4 of the read module 1 is two or three, the process goes to S240.

Next, at S240, when the number of image signal output channels outputting a defective image signal is two, the display 64 for displaying an error displays a message indicating poor connection of the outermost image signal output terminals 19 and 21 of the connector 4 of the read module 1. When the number of image signal output channels outputting a defective image signal among the image signal output terminals 17, 19, and 21 is three, the display 64 for displaying an error displays a message indicating poor connection of the power terminal 8 to the light source 2.

Thus, the error handling at S07 in the flowchart of FIG. 3 is performed and the control processing procedure for detecting poor connection, executed by the CPU 55 is terminated.

The advantages of the read module 1 and the poor connection detection apparatus and the poor connection detection method in the embodiment are as follows:

According to the read module 1 of the embodiment, the power terminal 8 to the light source 2 is placed in the proximity of one end of the terminals 22 and the image signal output terminals 17, 19, and 21 are placed in the proximity of the opposite end. Thus, when the connector 4 of the read module 1 is inserted into the controller connector 61 of the controller 51, if it is inclined in the placement direction of the terminals 22 in the insertion and mutual insertion becomes incomplete and poor connection occurs, electrical poor connection between the connector 4 and the controller connector 61 can be detected as output of the image signal output from the image signal output terminal 17, 19, 21 is checked. Poor connection of the connector 4 can be detected using the image signal output terminals 17, 19, and 21 required for reading the original image by the read module 1 and the power terminal 8 for lighting the light source 2 and it is not necessary to add any new terminal for detecting poor connection between the connector 4 and the controller connector 61 of the controller 51, so that the connector 4 and the space to install the connector 4 can be miniaturized, and productivity is also excellent.

Further, according to the read module 1 of the embodiment, one of the image signal output terminals 17, 19, and 21 (image signal output terminal 21) is placed on the outermost side of the terminals 22. Thus, when the connector 4 of the read module 1 is inclined in the placement direction of the terminals 22 relative to the controller connector 61 of the controller 51 and mutual insertion becomes incomplete and poor connection occurs, output of the image signal of the image signal output terminal 21 easily changes and poor connection between the connector 4 and the controller connector 61 can be detected more reliably based on the change in the output of the image signal.

According to the poor connection detection apparatus and the poor connection detection method of the embodiment, the difference between the white-level and the black-level voltage values output from the image signal output terminal 17, 19, 21 of the connector 4 is acquired and the presence or absence of poor connection between the connector 4 and the controller connector 61 is detected based on the voltage value difference. Thus, when the connector 4 of the read module 1 is inclined in the placement direction of the terminals 22 relative to the controller connector 61 of the controller 51 and mutual insertion becomes incomplete and poor connection occurs, poor connection can be detected easily. That is, as the power terminal 8 is placed in the proximity of one end of the terminals 22 and the image signal output terminals 17, 19, and 21 are placed in the proximity of the opposite end, the voltage of the image signal output from the image signal output terminal 17, 19, 21 easily changes, so that poor connection caused by inclination of the connector 4 can be detected easily. Poor connection can be detected using the image signal output terminals 17, 19, and 21 required for reading the image and the power terminal 8 and it is not necessary to add any new terminal for detecting poor connection, so that productivity is also excellent.

Modification

Figure 6:
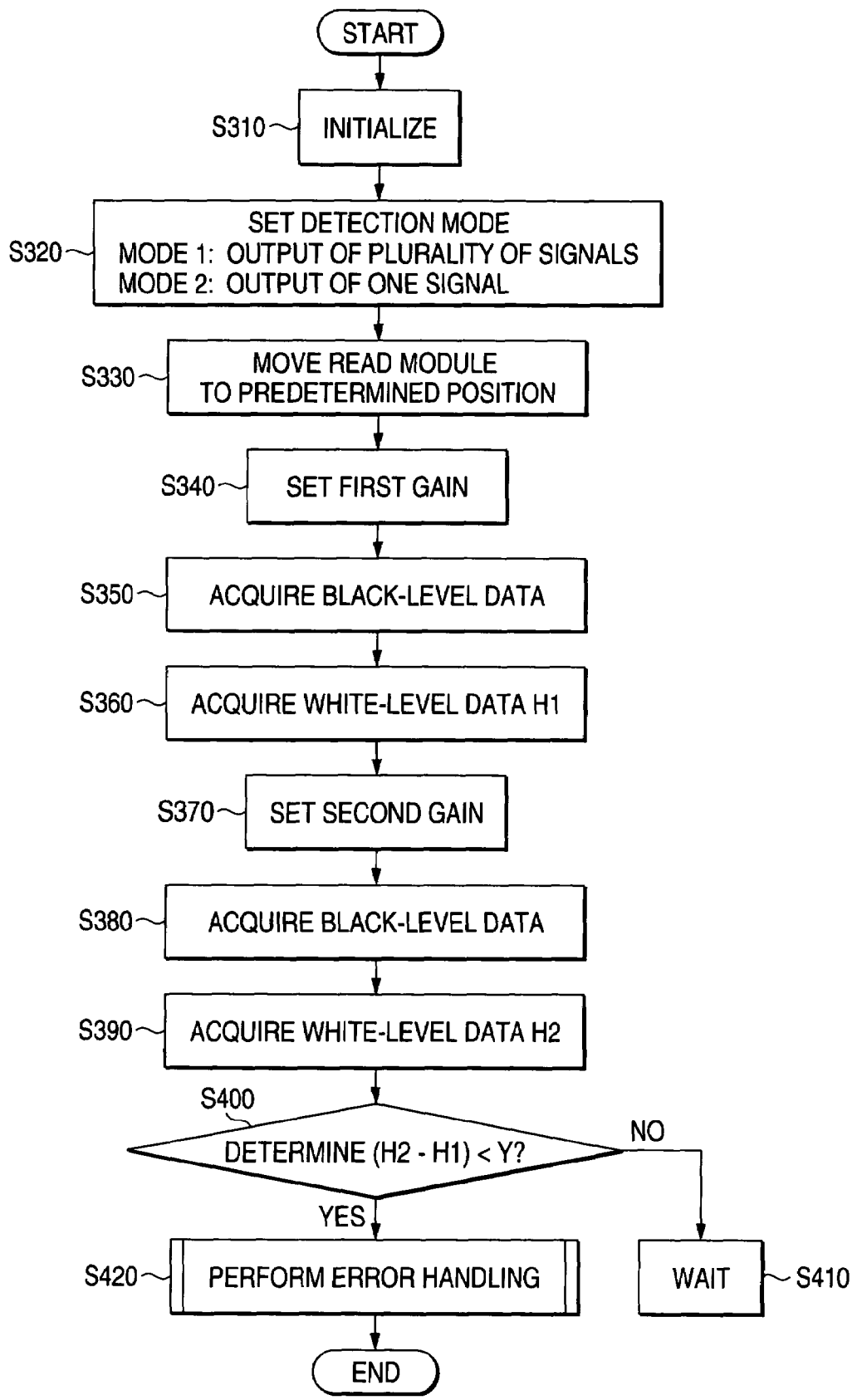
FIG. 6 is a flowchart to represent poor connection detection processing executed by the CPU in a modification incorporating the invention.

Next, a modification of the poor connection detection processing procedure executed by the CPU 55 will be discussed with the flowchart of FIG. 6. The common portion to the flowchart of the embodiment previously described with reference to FIG. 3 will not be discussed again in detail and the characteristic portion will be discussed below:

A control procedure shown in the flowchart of FIG. 6 is started when the user gives an instruction for incomplete insertion check through an interface such as the operation panel 65 made up of a panel, a keyboard, etc.

At S310, the variables in the CPU 55 and the variables in the read module 1 are initialized.

Next, at S320, a detection mode is set according to the procedure shown in the flowchart of FIG. 4.

Next, at S330, the read module 1 is moved to a position where it is opposed to the white board 63 previously placed in the controller 51 and used to acquire a reference signal with a predetermined spacing.

Next, at S340, the gain of the output voltage output from the image signal output terminal 17, 19, 21 and amplified by the amplifier 52a included in the AFE 52 is set as a first gain (here, the gain is 1) through the read control section 53.

Next, at S350, reflected light on the white board 63 is read by the photoelectric conversion element provided in the light shield area masked for preventing light from entering the photoelectric conversion element of the read module 1, and the voltage of the image signal output from the image signal output terminal 17, 19, 21 at the time is acquired in the AFE 52 as black-level data. That is, the black-level data is acquired by the photoelectric conversion element in the masked area with the light source 2 lit. The number of pieces of the black-level data may be one.

Next, at S360, offset adjustment is made to the image signal based on the black-level data acquired in the AFE 52, reflected light on the white board 63 is read in the unmasked area for detecting light in the read module 1, and the voltage of the image signal output from the image signal output terminal 17, 19, 21 at the time is acquired in the AFE 52 as white-level data H1 (since white-level data is acquired after offset adjustment is made based on the black-level data, the white-level data H1 results in a first output signal voltage difference representing the difference between the white-level and black-level image signal voltage values). Unlike the black-level data, the white-level data is data concerning all pixels of one line in the read range.

In the modification, as S340, S350, and S360 are executed, the function of a first output signal acquisition unit of the invention is provided.

Next, at S370, the gain of the output voltage output from the image signal output terminal 17, 19, 21 and amplified by the amplifier 52a included in the AFE 52 is set as a second predetermined gain larger than the first gain.

Next, at S380, reflected light on the white board 63 is read by the photoelectric conversion element provided in the light shield area masked for preventing light from entering the photoelectric conversion element of the read module 1, and the voltage value output from the image signal output terminal 17, 19, 21 at the time is acquired in the AFE 52 as black-level data.

Next, at S390, offset adjustment is made to the image signal based on the black-level data acquired in the AFE 52, reflected light on the white board 63 is read in the unmasked area for detecting light in the read module 1, and the voltage value output from the image signal output terminal 17, 19, 21 at the time is acquired in the AFE 52 as white-level data H2 (like H1, the white-level data H2 results in a second output signal voltage difference representing the difference between the white-level and black-level image signal voltage values). Unlike the black-level data, the white-level data is data concerning all pixels of one line in the read range.

In the modification, as S370, S380, and S390 are executed, the function of the second output signal acquisition unit of the invention is provided.

Next, at S400, the white-level data H1 acquired at S360 is subtracted from the white-level data H2 acquired at S390 and the result of (H2−H1) is compared with a predetermined voltage value Y to detect poor connection for determining whether or not poor connection exists.

Next, when it is determined at S400 that the result of (H2−H1) is equal to or greater than the predetermined voltage value Y, namely, when data of two-thirds or more, or three-quarters or more of (H2−H1) of all pixels, for example, is equal to or greater than the predetermined voltage value Y, the poor connection detection apparatus determines that no poor connection exists between the controller connector 61 and the connector 4 and an image can be read normally. Then, the process goes to S410. Since no poor connection exists between the connector 4 and the controller connector 61 and an image can be read normally, a wait state is maintained until a command signal from the user is input through the external interface.

Figure 5:
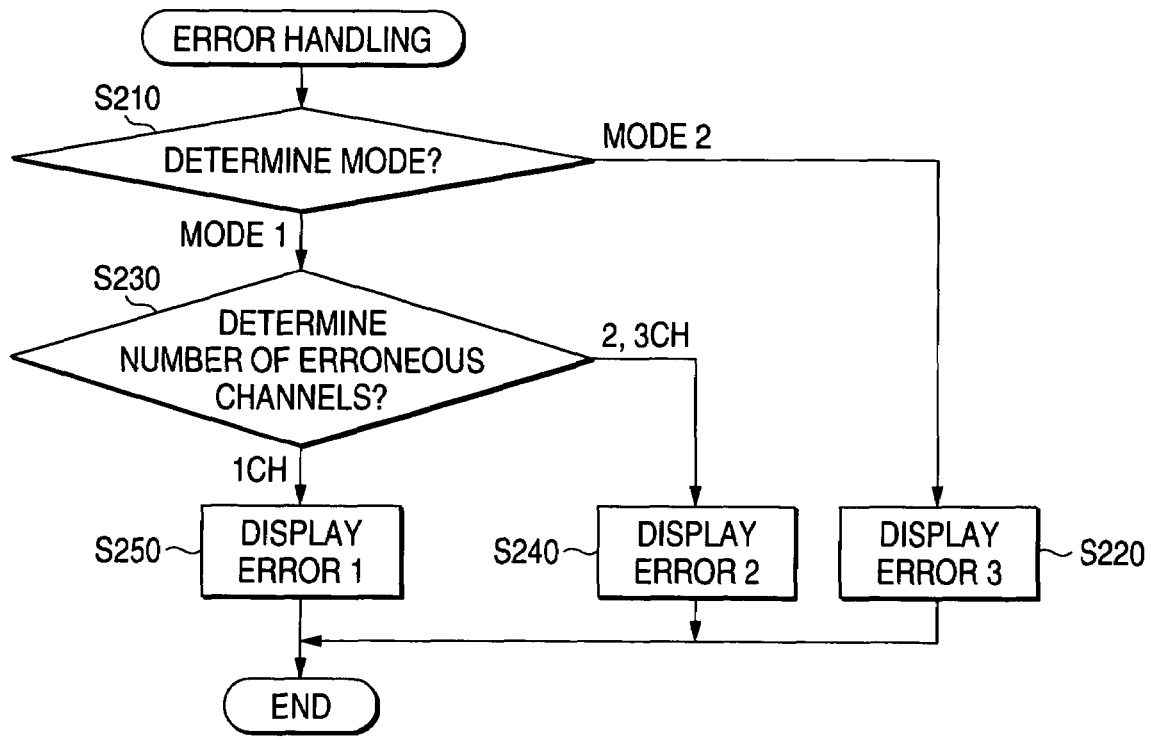
FIG. 5 is a flowchart to represent details of error handling executed in the detection processing in FIG. 3.

When it is determined at S400 that the result of (H2−H1) is less than the predetermined voltage value Y, namely, when data more than one-third or one-quarter of (H2−H1) of all pixels, for example, is less than the predetermined voltage value Y, the process goes to S420 and error handling is performed according to the procedure shown in the flowchart of FIG. 5.

The control processing procedure for detecting poor connection, executed by the CPU 55 in the modification is terminated.

The advantages of the poor connection detection apparatus and the poor connection detection method in the modification are as follows:

According to the modification, when poor connection occurs between the connector 4 and the controller connector 61, the voltage difference between the white and black image signals output from the image signal output terminal 17, 19, 21 of the connector 4 less changes as compared with that at the normal time although the gain is changed. Therefore, the difference between the first and second output signal voltage differences acquired in different gains is compared with the predetermined value, whereby poor connection caused by inclination of the connector 4 can be detected.

According to the embodiment of the invention, to detect the black-level image signal, light is applied to the white board 63, reflected light thereon is read by the photoelectric conversion element provided in the light shield area masked for preventing light from entering the photoelectric conversion element of the read module 1, and the voltage value output from the image signal output terminal 17, 19, 21 at the time is acquired as black-level data. However, using a black board in place of the white board 63, reflected light from the black board may be read in the unmasked area for detecting light in the read module 1 and the voltage value output from the image signal output terminal 17, 19, 21 at the time may be adopted as the black-level image signal.

According to the embodiment of the invention, the read module 1 outputs the image signal in the order of blue (B), green (G), and R (red) from the image signal output terminals 17, 19, and 21, but the image signal order is not limited to it and may be changed so that poor connection between the connectors can be detected more reliably. Black (K) may be provided in addition to blue (B), green (G), and R (red).

According to the embodiment of the invention, to provide electric connection between the controller 51 and the read module 1, the controller connector 61 is provided with the cable 62 and is fitted into the connector 4 fixed to the read module 1. However, the connector 4 of the read module 1 may be provided with the cable 62 and may be fitted into the controller connector 61 fixed to the controller 51 to provide electric connection therebetween.

A relay connector having connectors at both ends of the cable 62 may be provided so that the connectors at both ends of the cable included in the relay connector are fitted into the connector 4 fixed to the read module 1 and the controller connector 61 fixed to the controller 51 to provide electric connection therebetween.

According to the embodiment of the invention, the white board 63 is used to acquire black-level data and white-level data, but if both the white board 63 and a black board (not shown) are used, poor connection can be detected. To do this, the black board rather than the white board 63 is used at S350 and S360 in FIG. 6, black-level data is acquired at S350, and at S360, offset adjustment is made based on the black-level data, reflected light on the black board is read in the unmasked area for detecting light in the read module 1, and the voltage of the image signal output from the image signal output terminal 17, 19, 21 is acquired as white-level data H1 (the white-level data H1 is the first output signal voltage difference representing the difference between the white-level and black-level image signal voltage values). Next, at S380 and S390, using the white board 63, white-level data H2 is acquired as in the modification described above (the white-level data H2 is the second output signal voltage difference representing the difference between the white-level and black-level image signal voltage values). Next, at S400, (H2–H1) is compared with the predetermined voltage value Y to detect poor connection for determining whether or not poor connection exists. Although the gain is amplified to the second gain at S370, if both the black board and the white board are used, the difference between H1 and H2 can be determined clearly and therefore the need for setting the second gain at S370 can also be eliminated.

What is claimed is:

1. An apparatus, comprising:
a light source that applies light to an original to read an image on the original;
a photoelectric conversion section that converts reflected light from the original into an image signal of the image;
a connector to be electrically connected, the connector including a plurality of terminals placed side by side in a predetermined direction, the plurality of terminals including an image signal output terminal section that outputs the image signal and a power terminal section that inputs electric power for lighting the light source;
an output signal acquisition unit configured to acquire a difference between a voltage value of a white-level image signal and a voltage value of a black-level image signal, each separately output from the photoelectric conversion section via the image signal output terminal section; and
a poor connection detection unit configured to detect presence or absence of poor connection of the connector based on the difference acquired by the output signal acquisition unit,
wherein the power terminal section is placed in the proximity of one end of the plurality of terminals in the predetermined direction thereof,
the image signal output terminal section is placed in the proximity of an opposite end in the predetermined direction thereof,
the output signal acquisition unit comprises:
an amplification unit that amplifies a voltage output from the image signal output terminal section and allows a gain thereof to be switched between a first gain and a second gain,
a first output signal acquisition unit that sets the gain of the amplification unit to the first gain and acquires the output voltage, to obtain the difference between the white-level and black-level voltage values as a first output signal voltage difference, and
a second output signal acquisition unit that sets the gain of the amplification unit to the second gain and acquires the output voltage, to acquire the difference between the white-level and black-level voltage values as a second output signal voltage difference; and
the poor connection detection unit compares a difference between the first output signal voltage difference acquired by the first output signal acquisition unit and the second output signal voltage difference acquired by the second output signal acquisition unit with a predetermined value, to detect the presence or absence of poor connection of the connector.

2. A method for detecting a poor connection between a connector provided in a read module and a controller connector provided in a controller for controlling the read module, the connector including a plurality of terminals placed side by side in a predetermined direction, the plurality of terminals including an image signal output terminal section that outputs the image signal to the controller, the method comprising:
detecting white-level and black-level image signals separately output from the image signal output terminal section, voltage values of the white-level and black-level image signals to be used as the references for correcting variations in sensitivity in the read module;
acqiuiring a difference between the white-level voltage value and the black-level voltage value;
detecting presence or absence of poor connection between the connectors based on the acqiuired difference;
amplifying voltage values of the white-level and black-level image signals output from the image signal output terminal section while allowing gains thereof to be switched between a first gain and a second gain;
wherein the step of detecting the white-level and black-level image signals includes: detecting the voltage values of the white-level and black-level image signals when the gain is switched to the first gain and detecting the voltage values of the white-level and black-level image signals when the gain is switched to the second gain;

the acquiring step includes acquiring the difference between the white-level and black-level voltage values as a first output signal voltage difference when the gain is switched to the first gain and acquiring the difference between the white-level and black-level voltage values as a second output signal voltage difference when the gain is switched to the second gain; and the step of detecting the presence or absence includes comparing a difference between the first output signal voltage difference and the second output signal voltage difference with a predetermined value.

3. A poor connection apparatus for detecting poor connection between a connector provided in a read module and a controller connector, the connector including a plurality of terminals having an image signal output terminal section that outputs the image signal to the controller, the apparatus comprising:

an output signal acquisition unit configured to acqiuire a difference between a voltage value of a white-level image signal and a voltage value of a black-level image signal, each used as a reference for correcting variations in the sensitivity of the read module and each separately output from the image signal output terminal section; and a poor connection detection unit configured to detect presence or absence of poor connection of the connector based on the difference acquired by the output signal acquisition unit, wherein the output signal acquisition unit comprises:

an amplification unit that amplifies a voltage output from the image signal output terminal section and allows a gain thereof to be switched between a first gain and a second gain, a first output signal acquisition unit that sets the gain of the amplification unit to the first gain and acquires the output voltage, to obtain the difference between the white-level and black-level voltage values as a first output signal voltage difference, and a second output signal acquisition unit that sets the gain of the amplification unit to the second gain and aquires the output voltage, to acquire the difference between the white-level and black-level voltage values as a second output signal voltage difference; and the poor connection detection unit compares a difference between the first output signal voltage difference acquired by the first output signal acquisition unit and the second output signal voltage difference acquired by the second output signal acquisition unit with a predetermined value, to detect the presence or absence of poor connection of the connector.

* * * * *